United States Patent
Wei et al.

(10) Patent No.: US 11,958,015 B2
(45) Date of Patent: Apr. 16, 2024

(54) DUAL-PURPOSE HOUSHOLD WATER PURIFIER

(71) Applicant: YUNDA H&H TECH (Tianjin) CO., LTD., Tianjin (CN)

(72) Inventors: Enyu Wei, Tianjin (CN); Yinping Yuan, Tianjin (CN); Hao Xu, Tianjin (CN); Xu Yang, Tianjin (CN)

(73) Assignee: YUNDA H&H TECH (Tianjin) CO., LTD., Tianjin (CN)

( * ) Notice: Subject to any disclaimer, the term of this patent is extended or adjusted under 35 U.S.C. 154(b) by 184 days.

(21) Appl. No.: 17/557,173

(22) Filed: Dec. 21, 2021

(65) Prior Publication Data

US 2023/0137383 A1 May 4, 2023

(30) Foreign Application Priority Data

Nov. 3, 2021 (CN) .......................... 202111295529.7

(51) Int. Cl.
*B01D 61/12* (2006.01)
*B01D 61/08* (2006.01)
(Continued)

(52) U.S. Cl.
CPC ............. *B01D 61/12* (2013.01); *B01D 61/08* (2013.01); *B01D 61/10* (2013.01); *C02F 1/441* (2013.01);
(Continued)

(58) Field of Classification Search
CPC .......... B01D 2313/18; B01D 2313/243; B01D 2317/025; B01D 61/08; B01D 61/10; B01D 61/12; C02F 1/441; C02F 1/442; C02F 2201/004; C02F 2201/005; C02F 2201/007; C02F 2209/03; C02F 2209/40;
(Continued)

(56) References Cited

U.S. PATENT DOCUMENTS

| 5,316,673 A * | 5/1994 | Kohlmann ................ C02F 9/20 |
| | | 210/748.11 |
| 8,557,115 B2 * | 10/2013 | Collins ................... B01D 61/18 |
| | | 210/473 |
| 2020/0282346 A1 * | 9/2020 | Meza ........................ F04B 1/00 |

FOREIGN PATENT DOCUMENTS

CN 108928944 B * 3/2021 ............. C02F 1/001

OTHER PUBLICATIONS

English Translation of CN108928944 B downloaded from espacenet website. (Year: 2021).*

* cited by examiner

*Primary Examiner* — Terry K Cecil
(74) *Attorney, Agent, or Firm* — Shih IP Law Group, PLLC

(57) ABSTRACT

A dual-purpose household water purifier includes a main unit and an expansion unit which can be detachably connected. When the main unit is connected with the expansion unit, a booster pump can pressurize tap water entering a filter assembly. In the dual-purpose household water purifier, the main unit can be used as a non-electric drive water purifier. After the tap water enters the filter assembly and is filtered. The purified water flows into the purified water chamber of the pressure bucket, and the user takes the purified water. It is further provided an expansion unit. When the main unit is connected to the expansion unit, the booster pump can pressurize the pipeline, reducing application environmental restrictions on the water purifier. Through arrangement of the expansion unit, the water purifier can be operated in two operation modes of non-electric drive mode and electric drive mode.

10 Claims, 5 Drawing Sheets

(51) Int. Cl.
*B01D 61/10* (2006.01)
*C02F 1/44* (2023.01)

(52) U.S. Cl.
CPC .... *B01D 2313/18* (2013.01); *B01D 2313/243* (2013.01); *B01D 2317/025* (2013.01); *C02F 2201/005* (2013.01); *C02F 2209/03* (2013.01); *C02F 2209/40* (2013.01); *C02F 2301/08* (2013.01); *C02F 2307/10* (2013.01)

(58) Field of Classification Search
CPC .... C02F 2301/08; C02F 2307/10; C02F 9/20; E03C 1/04; E03C 2201/40
See application file for complete search history.

DUAL-PURPOSE HOUSHOLD WATER PURIFIER

CROSS REFERENCE TO RELATED APPLICATION

This application claims the priority of Chinese Patent Application No. 202111295529.7, entitled "DUAL-PURPOSE HOUSEHOLD WATER PURIFIER" filed with the Chinese Patent National Intellectual Property Administration on Nov. 3, 2021, which is incorporated herein by reference in its entirety.

TECHNICAL FIELD

The disclosure relates to the technical field of water treatment equipment and its surrounding supporting facilities, in particular to a dual-purpose household water purifier.

BACKGROUND ART

At present, most household water purifiers on the market are reverse osmosis water purifiers. The working principle of reverse osmosis is: reverse osmosis is the most precise membrane liquid separation technology. An operating pressure is applied on the inlet water (concentrated solution) side to overcome natural osmotic pressure. When the operating pressure higher than the natural osmotic pressure is applied to the concentrated solution side, a flow direction of the water molecules permeating naturally, will be reversed, and the water molecules in the inlet water (concentrated solution) will partially pass through the reverse osmosis membrane to become the purified water on the dilute solution side. The reverse osmosis equipment can block all soluble salts and organic matter with a molecular weight greater than 100, but allows the water molecules to pass through to achieve purpose of purifying water.

The reverse osmosis water purifiers can be used in two modes, one mode is an electric drive reverse osmosis water purifier, and the other is a non-electric drive reverse osmosis water purifier. The electric drive reverse osmosis water purifier is powered by an external power, and the electric energy drives operation of the water purifier. The electric energy provides power for the booster pump in the water purifier. The booster pump pressurizes the water to achieve an optimum water pressure required by reverse osmosis membrane. The non-electric reverse osmosis water purifier has no power input. The purification of the reverse osmosis membrane mainly depends on the water pressure of the tap water. The water molecules pass through the reverse osmosis membrane via the water pressure of the tap water, and other substances are intercepted to achieve purpose of purifying water.

In the reverse osmosis water purifiers used in homes, the electric drive water purifiers are widely used, and have lower requirements on water pressure of the raw water. There are even electric self-priming reverse osmosis water purifiers, with no requirements on water pressure of the raw water. The non-electric drive reverse osmosis water purifier has higher requirements on the water pressure of the raw water, the water pressure of the raw water is required to reach 0.2 MPa or above, and the use effect of the non-electric drive water purifier is slightly worse than that of the electric drive water purifier. However, the non-electric drive reverse osmosis water purifier has the advantages of no electronic components inside, low price, simple structure and small size. The non-electric drive reverse osmosis water purifier is especially suitable for homes with no power interface under cabinets in some old communities.

However, there are currently no machines on the market that have the advantages of these two reverse osmosis water purifiers at the same time, and users can only choose one according to their actual situation.

At present, in order to meet normal use of users, the non-electric drive reverse osmosis water purifiers and most of the electric drive reverse osmosis water purifiers need to be provided with one pressure bucket to store the purified water, and the pressure bucket is an air pressure bucket provided with an airbag therein. Storing and discharging water depends on changes in the airbag pressure. Due to existence of the airbag, the purified water cannot fill the entire pressure bucket, which results in a large volume of the pressure bucket and a longer storage time for the water in the pressure bucket, thereby causing a waste of space resources.

Therefore, how to improve current state in the prior art that household water purifiers have certain requirements on water pressure or power, resulting in poor adaptability of household water purifiers, has become an urgent problem for those skilled in the art.

SUMMARY

An objective of the present embodiment is to provide a dual-purpose household water purifier to solve the above-mentioned problems in the prior art and improve the adaptability and convenience of use of the household water purifier.

In order to achieve the above objective, the present disclosure provides a dual-purpose household water purifier, including:
  a main unit including a pressure bucket and a filter assembly; the pressure bucket includes a purified water chamber and a tap water chamber, and a partition membrane is arranged between the purified water chamber and the tap water chamber, and the partition membrane is capable of deforming to change volumes of the purified water chamber and the tap water chamber, the tap water chamber is configured for being in communication with a faucet, the purified water chamber is in communication with an outlet of the filter assembly, and the filter assembly is capable of filtering tap water;
  an expansion unit including a booster pump;
  the main unit is detachably connected to the expansion unit, and when the main unit is connected with the expansion unit, the booster pump is capable of pressurizing the tap water entering the filter assembly.

In some embodiments, the main unit further includes a four-side valve arranged between the pressure bucket and the filter assembly, and a check valve is arranged between the outlet of the filter assembly and the four-side valve.

In some embodiments, the filter assembly includes a first-stage filter core, a second-stage filter core and a third-stage filter core arranged in series in sequence, and an outlet of the third-stage filter core is in communication with the purified water chamber.

In some embodiments, when the expansion unit is connected with the main unit, the booster pump is located between the first-stage filter core and the second-stage filter core.

In some embodiments, the expansion unit further includes a low pressure switch and a water inlet solenoid valve which are communicated with the booster pump. The low pressure switch is arranged close to the first-stage filter core, the boost pump is arranged close to the second-stage filter core, and the water inlet solenoid valve is located between the low pressure switch and the booster pump.

In some embodiments, the second-stage filter core is connected with a concentrated water solenoid valve, and filtered concentrated water is discharged through the concentrated water solenoid valve.

In some embodiments, the expansion unit is connected with the main unit, a high pressure switch is further provided between the outlet of the filter assembly and the purified water chamber.

In some embodiments, the main unit includes a reserved connector and a pipe plug, and the pipe plug is detachably connected to the reserved connector; the expansion unit includes a switching plug adapted to the reserved connector. When the main unit is connected with the expansion unit, the reserved connector is connected to the switching plug; sealing elements are arranged between the reserved connector and the pipe plug, as well as between the reserved connector and the switching plug, respectively.

In some embodiments, when the main unit is connected with the expansion unit, the reserved connector is plug-connected to the switching plug.

In some embodiments, the expansion unit further includes a controller; and the faucet is a multi-channel switching faucet.

Compared with the prior art, the present disclosure has achieved the following technical effects. The dual-purpose household water purifier of the present disclosure includes the main unit and the expansion unit. The main unit includes the pressure bucket and the filter assembly, and the pressure bucket includes the purified water chamber and the tap water chamber. The partition membrane is arranged between the purified water chamber and the tap water chamber. The partition membrane can deform to change volumes of the purified water chamber and the tap water chamber. The tap water chamber is configured for being connected to the faucet, and the purified water chamber is connected to the outlet of the filter assembly. The filter assembly can filter tap water. The expansion unit includes the booster pump; the main unit and the expansion unit can be detachably connected, and when the main unit is connected with the expansion unit, the booster pump can pressurize the tap water entering the filter assembly.

In the dual-purpose household water purifier of the present disclosure, the main unit can be used as a non-electric drive water purifier. After the tap water enters the filter assembly and is filtered, the purified water flows into the purified water chamber of the pressure bucket. When the volume of the purified water in the purified water chamber increases, the tap water in the tap water chamber is squeezed out. When the tap water is injected into the tap water chamber of the pressure bucket, the purified water is discharged under the pressure of the tap water chamber, and the user takes the purified water. The filter assembly may adopt forms, such as reverse osmosis, ultrafiltration, nano-filtration, and ion exchange, with fewer restrictions on installation of the main unit. In the present disclosure, it is further provided the expansion unit. The expansion unit is detachably connected to the main unit. When the main unit is connected to the expansion unit, the booster pump can pressurize the pipeline, reducing application environmental restrictions on the water purifier. Through arrangement of the expansion unit, the water purifier can be operated in two operation modes of non-electric drive mode and electric drive mode, thereby improving the adaptability and convenience of use of the water purifier.

BRIEF DESCRIPTION OF THE DRAWINGS

In order to explain the embodiments of the present disclosure or the technical solutions in the prior art more clearly, the drawings in the embodiments will be described briefly below. Apparently, the drawings in the following description are only some embodiments of the present disclosure. Other drawings, for those of ordinary skill in the art, can be obtained based on these drawings, without creative efforts.

List of reference numbers: 1 main unit, 110 pressure bucket, 111 purified water chamber, 112 tap water chamber, 113 partition membrane, 120 filter assembly, 121 first-stage filter core, 122 second-stage filter core, 123 third-stage filter core, 130 four-side valve, 140 concentrated water solenoid valve, 150 check valve, 160 reserved connector, 170 pipe plug, 180 faucet, 2 expansion unit, 210 booster pump, 220 low pressure switch, 230 water inlet solenoid valve, 240 high pressure switch, 250 switching plug, and 260 controller.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments of the present disclosure, all other embodiments obtained by those of ordinary skill in the art without creative efforts shall fall within the protection scope of the present disclosure.

The present disclosure is aimed to provide a dual-purpose household water purifier to solve the above-mentioned problems in the prior art and improve the adaptability and convenience of use of the household water purifier.

In order to make the above objectives, features and advantages of the present disclosure more obvious and understandable, the present disclosure will be further described in detail below with reference to the accompanying drawings and embodiments.

Figure 1:
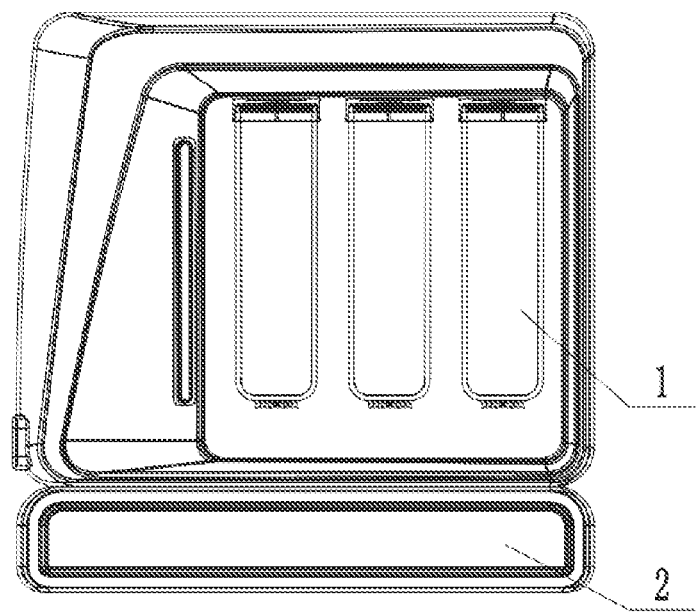
FIG. 1 is a schematic structural diagram of a dual-purpose household water purifier in an assembled state according to the present disclosure.
Figure 2:
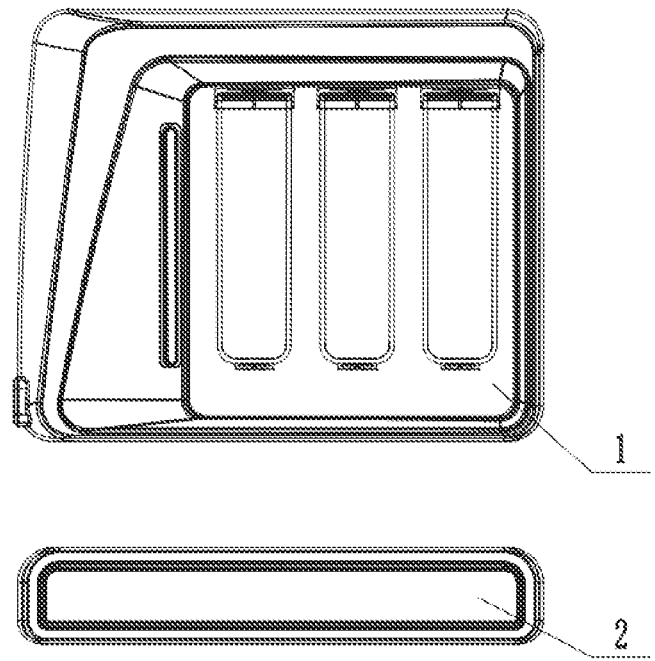
FIG. 2 is a schematic structural diagram of the dual-purpose household water purifier in a disassembled state according to the present disclosure.
Figure 3:
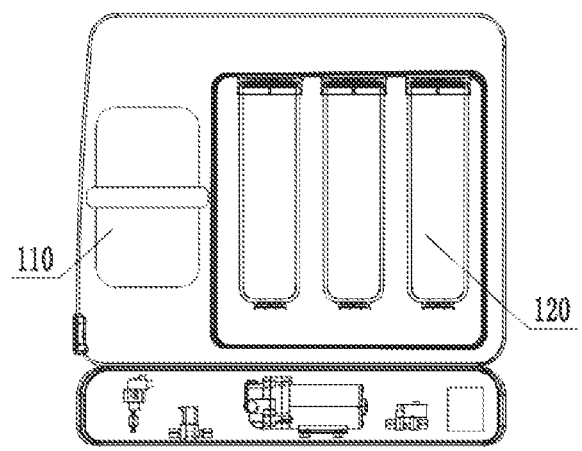
FIG. 3 is a schematic structural diagram of an interior of the dual-purpose household water purifier in the assembled state according to the present disclosure.
Figure 4:
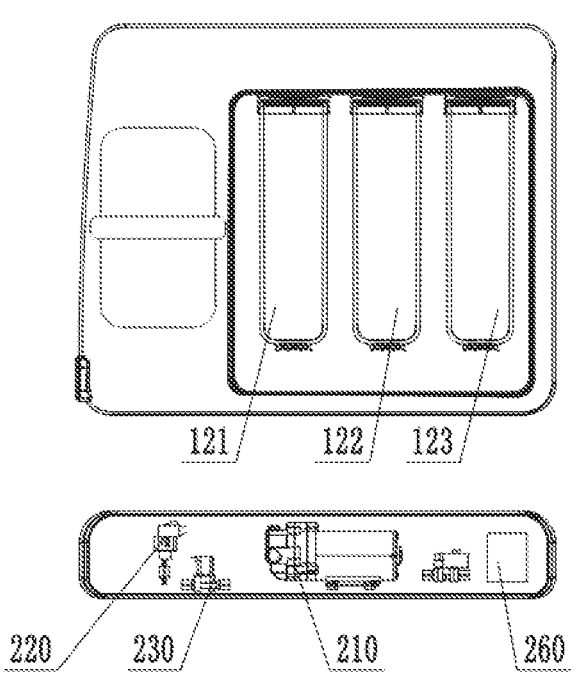
FIG. 4 is a schematic structural diagram of an interior of the dual-purpose household water purifier in the disassembled state according to the present disclosure.
Figure 5:
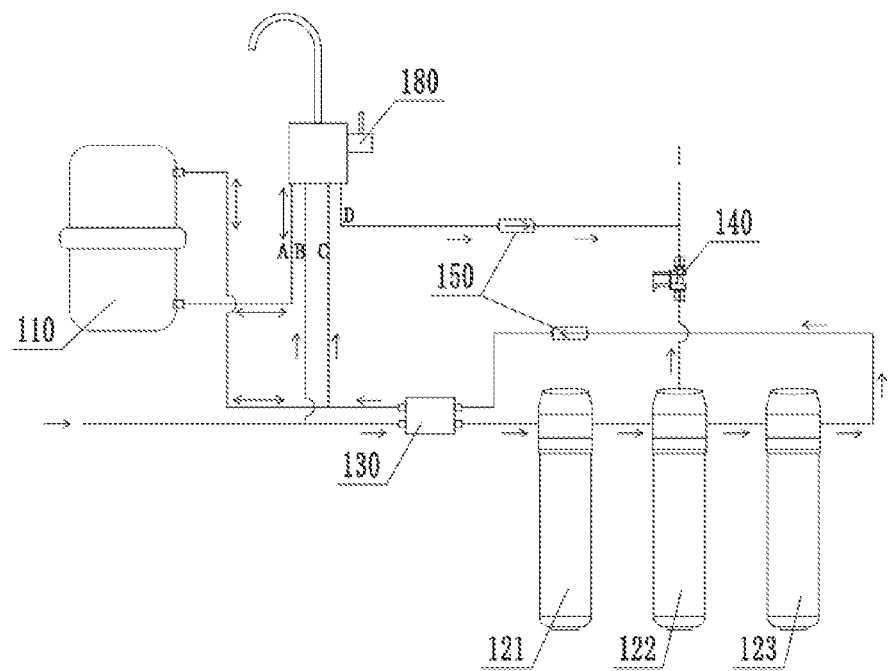
FIG. 5 is a working principle diagram for a main unit of the dual-purpose household water purifier according to the present disclosure.
Figure 6:
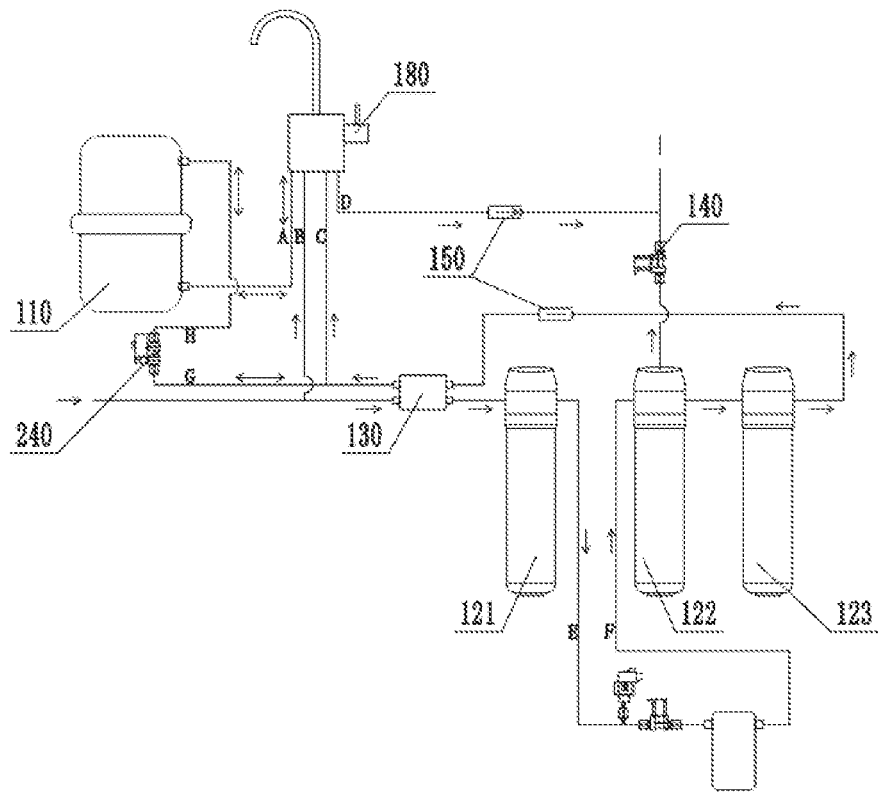
FIG. 6 is a working principle diagram of the dual-purpose household water purifier when the main unit and an expansion unit of the dual-purpose household water purifier are assembled, according to the present disclosure.
Figure 7:
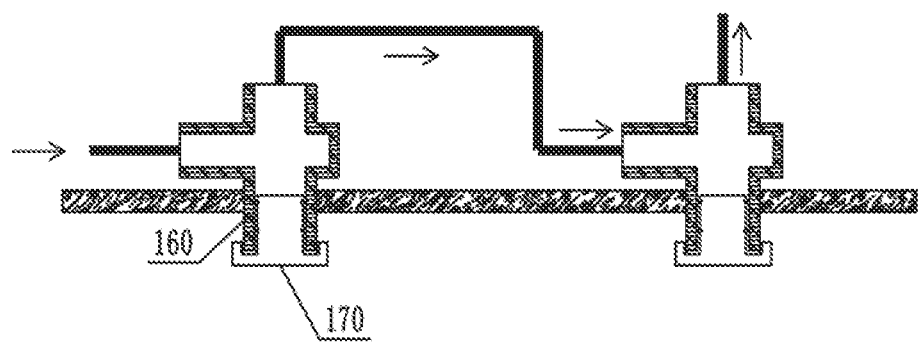
FIG. 7 is a partial structural diagram of the main unit of the dual-purpose household water purifier according to the present disclosure.
Figure 8:
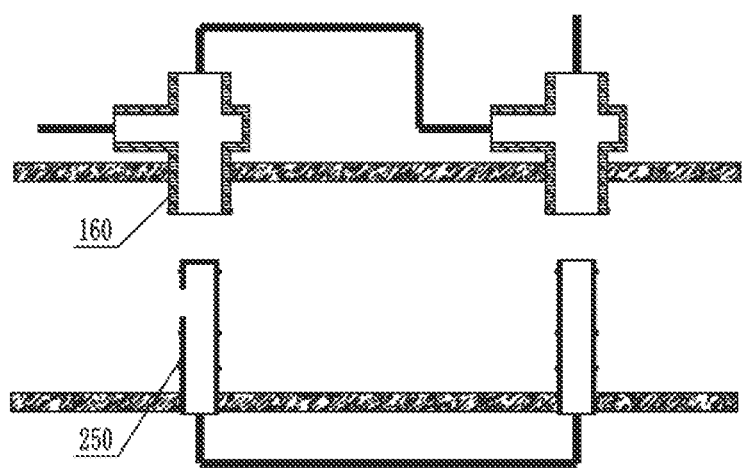
FIG. 8 is a partial structural diagram of the dual-purpose household water purifier before the main unit and the expansion unit of the dual-purpose household water purifier are connected, according to the present disclosure.
Figure 9:
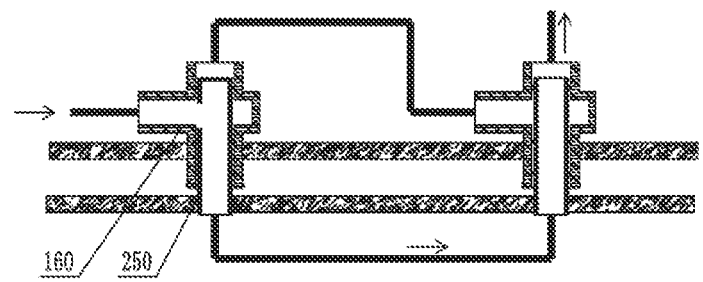
FIG. 9 is a partial structural diagram of the dual-purpose household water purifier after the main unit and the expansion unit of the dual-purpose household water purifier are connected, according to the present disclosure.
Figure 10:
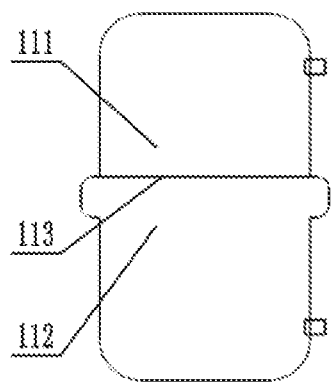
FIG. 10 is a schematic structural diagram of a pressure bucket of the dual-purpose household water purifier according to the present disclosure.
Figure 11:
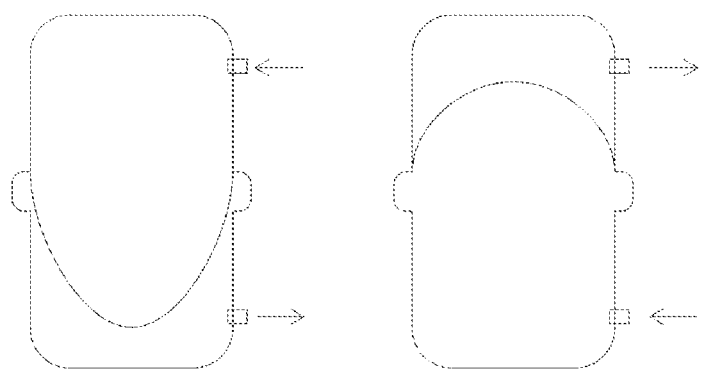
FIG. 11 is a schematic structural diagram of the pressure bucket of the dual-purpose household water purifier during operation, according to the present disclosure.

Referring to FIGS. 1-11, FIG. 1 is a schematic structural diagram of a dual-purpose household water purifier in an assembled state according to the present disclosure; FIG. 2 is a schematic structural diagram of the dual-purpose household water purifier in a disassembled according to the present disclosure; FIG. 3 is a schematic structural diagram of an interior of the dual-purpose household water purifier in the assembled state according to the present disclosure; FIG. 4 is a schematic structural diagram of an interior of the dual-purpose household water purifier in the disassembled state according to the present disclosure; FIG. 5 is a working principle diagram for a main unit of the dual-purpose household water purifier according to the present disclosure; FIG. 6 is a working principle diagram of the dual-purpose household water purifier when the main unit and an expansion unit of the dual-purpose household water purifier are assembled, according to the present disclosure; FIG. 7 is a partial structural diagram of the main unit of the dual-purpose household water purifier according to the present disclosure; FIG. 8 is a partial structural diagram of the dual-purpose household water purifier before the main unit and the expansion unit of the dual-purpose household water purifier are connected, according to the present disclosure; FIG. 9 is a partial structural diagram of the dual-purpose household water purifier after the main unit and the expansion unit of the dual-purpose household water purifier are connected, according to the present disclosure; FIG. 10 is a schematic structural diagram of a pressure bucket of the dual-purpose household water purifier according to the present disclosure; FIG. 11 is a schematic structural diagram of the pressure bucket of the dual-purpose household water purifier during operation, according to the present disclosure.

The present disclosure provides a dual-purpose household water purifier, which includes a main unit 1 and an expansion unit 2. The main unit 1 includes a pressure bucket 110 and a filter assembly 120. The pressure bucket 110 includes a purified water chamber 111 and a tap water chamber 112. A partition membrane 113 is provided between the purified water chamber 111 and the tap water chamber 112. The partition membrane 113 can deform to change volumes of the purified water chamber 111 and the tap water chamber 112. The tap water chamber 112 is in communication with the faucet 180. The purified water chamber 111 is communicated with an outlet of the filter assembly 120, and the filter assembly 120 can filter the tap water. The expansion unit 2 includes a booster pump 210; the main unit 1 and the expansion unit 2 are detachably connected with each other. When the main unit 1 is connected with the expansion unit 2, the booster pump 210 can pressurize the tap water entering the filter assembly 120.

In the dual-purpose household water purifier of the present disclosure, the main unit 1 can be used as a non-electric drive water purifier. After the tap water enters the filter assembly 120 and is filtered, the purified water flows into the purified water chamber 111 of the pressure bucket 110. When the volume of the purified water in the purified water chamber 111 increases, the tap water in the tap water chamber 112 is squeezed and discharged. When the tap water is injected into the tap water chamber 112 of the pressure bucket 110, the purified water is discharged under the pressure of the tap water chamber 112, and the user takes the purified water. The filter assembly 120 may take the form, such as reverse osmosis, ultrafiltration, nano-filtration, and ion exchange, and the main unit 1 has fewer installation restrictions. It is noted that the partition membrane 113 is arranged between the purified water chamber 111 and the tap water chamber 112. The partition membrane 113 may be made of an elastic material or a flexible material. When the partition membrane 113 is made of an elastic material, and when the purified water in the purified water chamber 111 or the tap water in the tap water chamber 112 increases, the partition membrane 113 can be squeezed to deform toward a side with less pressure. The partition membrane 113 may be made of flexible material. When the partition membrane 113 is made of a flexible material, an area of the partition membrane 113 is larger than the cross-sectional area of the purified water chamber 111 or the cross-sectional area of the tap water chamber 112. When the volume of the purified water or the tap water increases, the partition membrane 113 deforms to expand toward the side with less pressure. The volumes of the purified water chamber 111 and the tap water chamber 112 change. When the pressure in the purified water chamber 111 is equal to that in the tap water chamber 112, the partition membrane 113 is located between the purified water chamber 111 and the tap water chamber 112, and the partition membrane 113 is formed with wrinkles.

In the present disclosure, an expansion unit 2 is provided together with the main unit 1. The expansion unit 2 is detachably connected to the main unit 1. When the main unit 1 is connected with the expansion unit 2, the booster pump 210 can pressurize the pipeline, thereby reducing application environmental restrictions on the water purifier. The expansion unit 2 is provided in the present disclosure, and the water purifier can operate in two working modes of non-electricity working mode and electric drive working mode, thereby improving adaptability and convenience of use of the water purifier. It should also be noted that the pressure bucket 110 of the present disclosure adopts a water drive mode, has a small volume, and improves water storage efficiency.

The main unit 1 further includes a four-side valve 130, the four-side valve 130 is arranged between the pressure bucket 110 and the filter assembly 120, and a check valve 150 is arranged between the outlet of the filter assembly 120 and the four-side valve 130. After the tap water enters the main unit 1, it first passes through the four-side valve 130, and then through the filter assembly 120. The purified water passes through the check valve 150, and then flows into the purified water chamber 111 of the pressure bucket 110 through a purified water pipeline of the four-side valve 130. The check valve 150 can prevent the water in the pressure bucket 110 from returning, and achieve an effect of holding the pressure inside the pipeline, so as to ensure that the four-side valve 130 can work normally. The four-side valve 130 is configured to cut off raw water supply through its internal mechanical structure when the pressure in the purified water pipeline reaches a certain pressure, so as to achieve the effect of stopping when the water is full.

In this embodiment, the filter assembly 120 includes a first-stage filter core 121, a second-stage filter core 122, and a third-stage filter core 123 arranged in series in sequence.

An outlet of the third-stage filter core 123 is connected to the purified water chamber 111, and the purified water enters the purified water chamber 111. In other embodiments of the present disclosure, the structure and type of the filter assembly 120 may be set according to actual purification requirements.

Specifically, when the expansion unit 2 is connected to the main unit 1, the booster pump 210 is located between the first-stage filter core 121 and the second-stage filter core 122. When the main unit 1 is connected with the expansion unit 2, a direction of the water path is changed and the booster pump 210 is configured to pressurize the pipeline, so that the water purifier can be operated in an electric drive mode, thereby no requirements on the water pressure of the raw water. In other embodiments of the present disclosure, when the expansion unit 2 is connected to the main unit 1, the booster pump 210 may be arranged in front of the first-stage filter core 121 or between the second-stage filter core 122 and the third-stage filter core 123, which can be selected according to purification demand, thereby improving the flexibility and adaptability of the water purifier.

More specifically, the expansion unit 2 further includes a low pressure switch 220 and a water inlet solenoid valve 230. The low pressure switch 220 and the water inlet solenoid valve 230 are both communicated with the booster pump 210. The low pressure switch 220 is arranged close to the first-stage filter core 121, and the booster pump 210 is arranged close to the second-stage filter core 122, and the water inlet solenoid valve 230 is located between the low pressure switch 220 and the booster pump 210. After the expansion unit 2 is installed, a purified water process is changed. The water purifier is changed as an electric drive water purifier. In addition to the booster pump 210, a low-pressure switch 220 and a water inlet solenoid valve 230 are provided to ensure normal operation of the electric drive water purifier. After the water flows out of the first-stage filter core 121, it passes through the low pressure switch 220 and the water inlet solenoid valve 230, is pressurized by the booster pump 210, and flows into the second-stage filter core 122 and the third-stage filter core 123 to be further filtered.

At the same time, the second-stage filter core 122 is connected with a concentrated water solenoid valve 140, and the filtered concentrated water can be discharged through the concentrated water solenoid valve 140. A main function of the concentrated water solenoid valve 140 is to open or close the water path through the on-off of the circuit, so as to achieve flushing function of the reverse osmosis membrane (in this embodiment, as an example, the filter assembly 120 adopts the reverse osmosis filtration mode). The concentrated water solenoid valve 140 is different from the conventional solenoid valve, it is a special solenoid valve for reverse osmosis concentrated water. The concentrated water solenoid valve 140 is provided with a through hole inside thereof. When the concentrated water solenoid valve 140 is closed, some water still flows through the concentrated water solenoid valve 140, thereby achieving a function of a concentrated water proportioner required by normal reverse osmosis operation. It should also be noted that when the main unit 1 is used alone, the concentrated water solenoid valve 140 is out of electric drive control. At this time, the concentrated water solenoid valve 140 is used as a concentrated water proportioner to ensure normal operation of the system. When the main unit 1 is connected with the expansion unit 2, the concentrated water solenoid valve 140 can not only fulfill the role of the concentrated water proportioner, but also control flushing and prolong the service life of the reverse osmosis membrane. Correspondingly, the concentrated water solenoid valve 140 is also connected with a check valve 150 to prevent the concentrated water from flowing back.

In addition, when the expansion unit 2 is connected to the main unit 1, a high pressure switch 240 is further provided between the outlet of the filter assembly 120 and the purified water chamber 111, and the purified water filtered by the filter assembly 120 flows into the purified chamber 111 of the pressure bucket 110 through the high pressure switch 240.

Further, the main unit 1 includes a reserved connector 160 and a pipe plug 170, and the pipe plug 170 is detachably connected to the reserved connector 160. The expansion unit 2 includes a switching plug 250 that is adapted to the reserved connector 160, and the reserved connector 160 is detachably connected with the switching plug 250. When the main unit 1 is connected with the expansion unit 2, the reserved connector 160 is connected with the switching plug 250. When the main unit 1 is operated independently, the pipe plug 170 blocks the reserved connector 160, and when the main unit 1 is connected with the expansion unit 2, the pipe plug 170 is removed, and the reserved connector 160 is connected to the switching plug 250 to change the flow direction of the pipeline. Sealing elements are provided between the reserved connector 160 and the pipe plug 170 as well as between the reserved connector 160 and the switching plug 250 respectively to avoid leakage. In actual operation, a sealing element may be provided at the reserved connector 160 for sealing in two conditions, which is economical.

In other embodiments of the present disclosure, when the main unit 1 is connected with the expansion unit 2, the reserved connector 160 is plugged and connected with the switching plug 250, which is convenient and quick to disassemble and assemble, and further improves the adaptability of the water purifier and facilitates operation.

Furthermore, the expansion unit 2 further includes a controller 260, which is connected to the concentrated water solenoid valve 140 to control the working state thereof. In addition, the low pressure switch 220, the water inlet solenoid valve 230, the booster pump 210, the high-voltage switches 240 are all connected to the controller 260. The faucet 180 is a multi-channel switching faucet, and a C channel is a purified water pipeline. When the faucet 180 is closed, the C channel is closed, and the water is not discharged from the faucet 180. When the faucet 180 is in an opened state, the C channel is opened and the purified water is discharged from the faucet 180. Furthermore, when the faucet 180 is closed, an A channel is communicated with a D channel, the A channel is disconnected from a B channel, and the C channel is closed. At this time, the purified water produced by the water purifier enters the purified water chamber 111 of the pressure bucket 110. The tap water flows along the A channel to the D channel, and then is directly discharged to a sewer along the concentrated water pipeline of the water purifier until the tap water in the tap water chamber 112 is emptied, and the purified water completely fills the entire pressure bucket 110. When the faucet 180 is opened, the A channel is communicated with the B channel, the A channel is disconnected with the D channel, and the C channel is opened. At this time, the tap water flows through the A channel along the B channel, and then enters the tap water chamber 112 of the pressure bucket 110; under action of the tap water, the purified water is discharged from the outlet of the faucet 180 along the C channel, and the user can directly take the purified water.

The dual-purpose household water purifier of the present disclosure includes a main unit 1 and an expansion unit 2, and the main unit 1 and the expansion unit 2 are detachably connected with each other. When the main unit 1 is used independently, the water purifier is a non-electric drive water purifier. When the water purifier needs to be expanded to an electrically driven water purifier, only the pipe plug 170 is removed and the reserved connector 160 is connected with the switching plug 250 so as to change the direction of the water path of the water purifier. The tap water enters the two-stage filter core 122 through the E and F pipelines. The purified water filtered by the filter assembly 120 enters the purified water chamber 111 of the pressure bucket 110 through the G and H pipelines. When the main unit 1 needs to be reused, the switching plug 250 is removed to separate the main unit 1 and the expansion unit 2, and the reserved connector 160 is still blocked by the pipe plug 170. The main unit 1 can still be used as a non-electric drive water purifier, thereby improving the adaptability and convenience of the water purifier.

In the present disclosure, specific examples are used to illustrate the principles and implementation of the present disclosure. The description of the above examples is only used to help understand the method and core idea of the present disclosure. Furthermore, for those of ordinary skill in the art, according to the idea of the disclosure, the changes will be made in the implementation and the scope of application. In summary, the content of this specification should not be construed as a limitation to the present disclosure.

What is claimed is:

1. A dual-purpose household water purifier, comprising:
   a main unit comprising a pressure bucket and a filter assembly, wherein the pressure bucket comprises a purified water chamber and a tap water chamber, and a partition membrane is arranged between the purified water chamber and the tap water chamber, and the partition membrane deforms to change volumes of the purified water chamber and the tap water chamber, the tap water chamber is in communication with a first channel of a faucet, the purified water chamber is in communication with an outlet of the filter assembly, and the filter assembly filters tap water;
   an expansion unit comprising a booster pump;
   wherein the main unit is detachably connected to the expansion unit, and when the main unit is connected with the expansion unit, the booster pump pressurizes the tap water entering the filter assembly; and
   wherein a tap water source is connected with a second channel of the faucet, the purified water chamber is in communication with a third channel of the faucet, and the faucet is configured to:
     upon being closed, connect the first channel with a fourth channel of the faucet, disconnect the first channel from the second channel and close the third channel such that purified water produced by the filter assembly enters the purified water chamber, and the tap water from the tap water source flows along the first channel to the fourth channel and is discharged to a sewer; and
     upon being opened, connect the first channel with the second channel, disconnect the first channel from the fourth channel, and open the third channel such that the tap water from the tap water source flows through the second channel and the first channel and enters the tap water chamber, and under action of the tap water in the tap water chamber, the purified water is discharged from an outlet of the faucet along the third channel.

2. The dual-purpose household water purifier according to claim 1, wherein the main unit further comprises a four-side valve arranged between the pressure bucket and the filter assembly, and a check valve is arranged between the outlet of the filter assembly and the four-side valve.

3. The dual-purpose household water purifier according to claim 1, wherein the filter assembly comprises a first-stage filter core, a second-stage filter core and a third-stage filter core arranged in series in sequence, and an outlet of the third-stage filter core is in communication with the purified water chamber.

4. The dual-purpose household water purifier according to claim 3, wherein when the expansion unit is connected to the main unit, the booster pump is located between the first-stage filter core and the second-stage filter core.

5. The dual-purpose household water purifier according to claim 3, wherein the expansion unit further comprises a low pressure switch and a water inlet solenoid valve which are communicated with the booster pump, the low pressure switch is arranged upstream from the boost pump and the water inlet solenoid valve, the boost pump is arranged closer to the second-stage filter core than the low pressure switch and the water inlet solenoid valve, and the water inlet solenoid valve is located between the low pressure switch and the booster pump.

6. The dual-purpose household water purifier according to claim 5, wherein the second-stage filter core is connected with a concentrated water solenoid valve, and filtered concentrated water is discharged through the concentrated water solenoid valve.

7. The dual-purpose household water purifier according to claim 1, wherein when the expansion unit is connected to the main unit, a high pressure switch is further provided between the outlet of the filter assembly and the purified water chamber.

8. The dual-purpose household water purifier according to claim 1, wherein the main unit comprises a reserved connector and a pipe plug, and the pipe plug is detachably connected to the reserved connector; the expansion unit comprises a switching plug fitted into the reserved connector, when the main unit is connected with the expansion unit, the reserved connector is connected to the switching plug; sealing elements are arranged between the reserved connector and the pipe plug, as well as between the reserved connector and the switching plug.

9. The dual-purpose household water purifier according to claim 8, wherein when the main unit is connected to the expansion unit, the reserved connector is plug-connected to the switching plug.

10. The dual-purpose household water purifier according to claim 1, wherein the expansion unit further comprises a controller; and the faucet is a multi-channel switching faucet.

* * * * *